May 18, 1937. A. J. LAUTMANN 2,081,011
COMBINED CAKE BREAKER, PASTRY KNIFE, AND SERVER
Filed Aug. 6, 1936
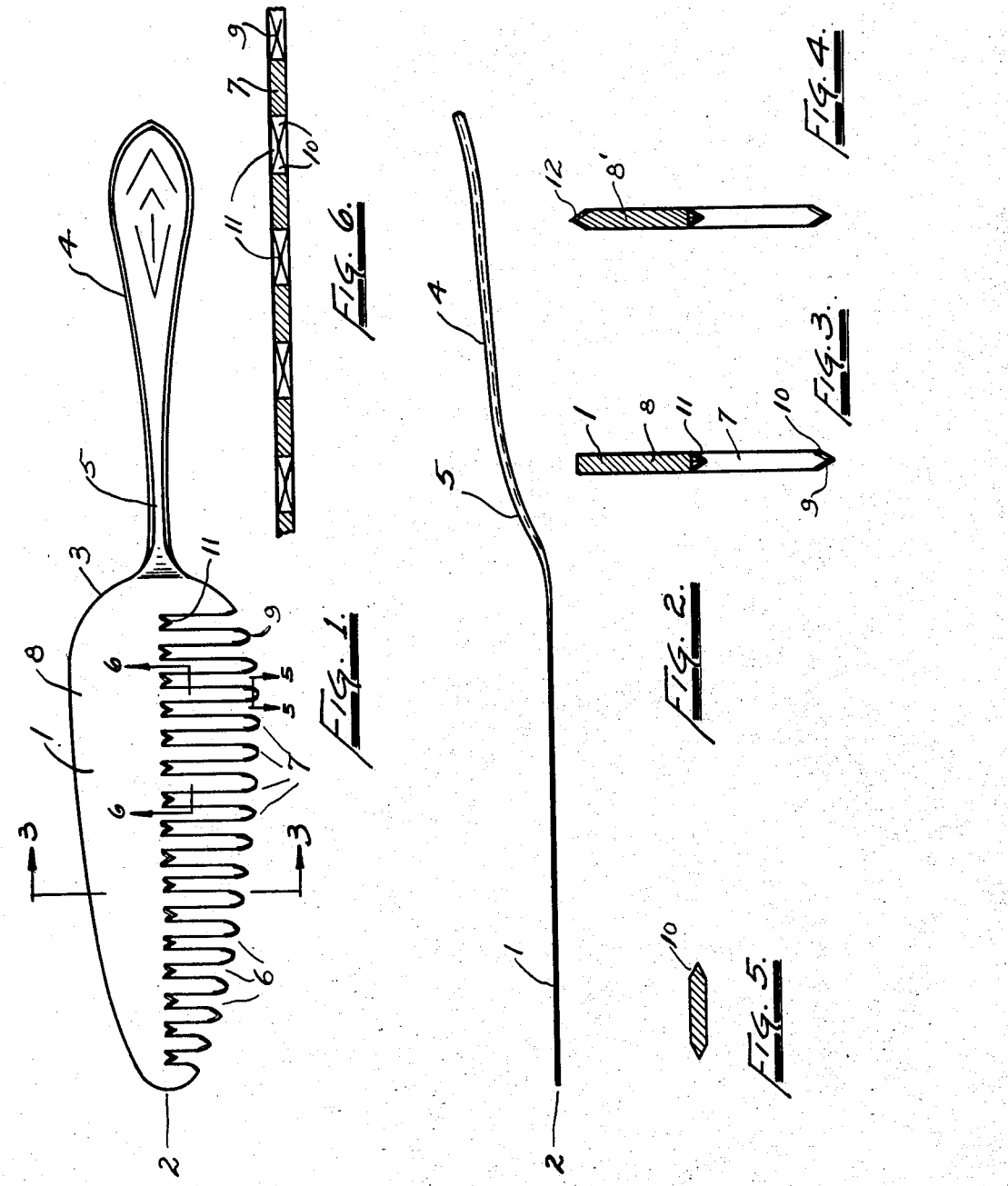
INVENTOR.
Alfred J. Lautmann
BY Samuel Weisman
ATTORNEY.

Patented May 18, 1937

2,081,011

UNITED STATES PATENT OFFICE 2,081,011

COMBINED CAKE BREAKER, PASTRY KNIFE, AND SERVER

Alfred J. Lautmann, Detroit, Mich., assignor to Iodent Chemical Company, Detroit, Mich., a corporation of Michigan Application August 6, 1936, Serial No. 94,641

3 Claims. (Cl. 30—9)

The present invention pertains to a novel combined cake breaker, pastry knife, and server, and the principal object is to provide a single and simple device adapted for the two separate operations of severing the portion of pastry and serving it. Although the device is described herein principally in connection with breaking and serving cake, it is also adapted for cutting pastry as distinguished from breaking it, as in the case of pies.

In the accomplishment of this object, the body of the device is in the form of a flat blade having the tapered shape of a conventional pastry server or lifter. This member is somewhat elongated and has both its ends rounded, with a handle extending from the wider end. This particular shape has been found in practice to be very desirable in lifting and serving a portion of pastry.

In keeping with the object of the invention as stated above, to provide for the severing of pastry into portions as well as serving the portions, tines are formed along one of the edges of this blade. These tines are formed by slotting the blade from one of its longer edges in a direction perpendicular to the longitudinal axis of the blade and approximately half across the blade. This formation leaves about half of the blade unslotted, whereby to provide a substantial back for the tines. The points of the tines are sharpened, and between them may be formed teeth in the closed ends of the slots. The tines, when inserted perpendicularly into a cake, sever the cake by the desired breaking action.

The handle that extends from the wider end of the blade is bent to lie in a plane above that of the blade. After a portion of pastry has been severed, it is lifted and served by inserting the blade under it. In this connection, the blade retains the shape of the usual pastry server and is therefore well adapted to this purpose. The elevation of the handle in the manner described facilitates the insertion of the blade beneath the portion of pastry.

The unslotted longitudinal edge of the blade may be sharpened for cutting pastry that is less readily broken by the tines. After cutting a portion of pastry by the sharpened edge, it may be lifted and served on the blade in the manner previously described.

The invention is fully disclosed by way of example in the following description and in the accompanying drawing in which Figure 1 is a plan view of the device;

Figure 2 is a side elevation thereof;

Figure 3 is a transverse cross-section;

Figure 4 is a similar section of a modification;

Figure 5 is a section on the line 5—5 of the Figure 1; and

Figure 6 is a section on the line 6—6 of the Figure 1.

Reference to these views will now be made by use of like characters that are employed to designate corresponding parts throughout.

The device as shown in Figure 1 comprises a flat blade 1 having the shape of the conventional cake server, tapering to a rounded point 2 and having its rear wider end also rounded as indicated by the numeral 3. This member is in the form of a stamping, and a handle 4 is provided at one end of it. The handle is provided at the wider end 3 and extends from the longitudinal axis of the blade. Preferably, the handle rises from the plane of the blade 1 in the form of a bend 5, so that the major portion of the handle lies above the plane of the blade for a purpose that will presently be described. The handle may be integral or separate.

A series of slots 6 is cut from one of the longer edges of the blade, in a direction transverse of the blade or perpendicular to the longitudinal axis of the blade. These slots are parallel and of equal width and extend approximately to the longitudinal axis of the blade as clearly illustrated in Figure 1. The purpose of the slots is to form tines 7, and the unslotted half 8 of the blade constitutes a substantial and durable back for the tines.

The free end of each tine is brought to a point as indicated by the numeral 9 and is beveled or sharpened at the edges as indicated by the numeral 10 in Figure 5.

At the bottoms or closed ends of the slots 6, small teeth 11 may be formed. These are not absolutely essential but are desirable, especially if a cutting effect is desired. These teeth are also pointed and sharpened in the same manner as the tines 7.

The back 8' of the blade may have its edge sharpened at 12, if desired, as illustrated in the modification in Figure 3. This edge may be used as a knife for cutting purposes, as distinguished from the breaking action for which the tines are intended.

In the use of the device for separating portions of cake, the points of the tines 7 are forced into the cake after the manner of a knife. Due to the consistency and texture of a cake, it is preferable to break rather than cut it, and such breaking is effected by the action of the tines. If the cake is not completely severed by the tines alone, the teeth 11 complete the work.

After a portion of cake has been separated, it may be lifted and served on the surface of the blade 1. The blade is merely inserted beneath the portion of the cake in the manner of an ordinary cake server, it being noted that the blade retains the outline of a cake server even though formed with tines. The lift of the handle 4 above the plane of the blade by virtue of the bend 5 permits an easier insertion of the blade beneath the portion of cake than would be possible if the blade and handle were in the same plane. Despite this relation of the blade and handle, the device may be formed in a single stamping operation with suitable dies.

In serving portions of pastry that are better cut than broken, the sharpened edge 12 is used. Thereafter, the portion is lifted and served on the blade in the manner already described.

Although specific embodiments of the invention have been illustrated and described, it will be understood that various alterations in the details of construction may be made without departing from the scope of the invention, as indicated by the appended claims.

What I claim is:

1. A cake breaker, pastry knife, and server comprising a substantially flat elongated blade, a handle extending from said blade, said blade being slotted from one of its longer edges to form tines, said tines being pointed and edge-sharpened at their free ends, the slots between the tines being substantially as wide as the tines.

2. A cake breaker, pastry knife, and server comprising a substantially flat elongated blade, a handle extending from said blade, said blade being slotted from one of its longer edges to approximately the longitudinal axis, to form tines, said tines being pointed and edge-sharpened at their free ends, the slots between the tines being substantially as wide as the tines.

3. A cake breaker, pastry knife, and server comprising a substantially flat elongated blade, a handle extending from said blade, said blade being slotted from one of its longer edges to form tines, and teeth formed integral with said body at substantially the longitudinal center of said blade and in the same plane with said blade and tines.

ALFRED J. LAUTMANN.